United States Patent
Raible

[15] 3,676,367
[45] July 11, 1972

[54] ADSORBENT FOR BEVERAGES

[72] Inventor: Karl J. Raible, Grafelfing, Germany

[73] Assignee: Aktiengesellschaft Fur Brauerei-Industrie, Basel, Switzerland

[22] Filed: Nov. 13, 1969

[21] Appl. No.: 876,609

[30] Foreign Application Priority Data

Nov. 22, 1968 Switzerland .....................17,453/68

[52] U.S. Cl. ..............................252/451, 252/455 R, 99/48
[51] Int. Cl. ......................................B01j 11/36, B01j 11/40
[58] Field of Search .....................252/449, 451, 455 R, 450; 99/36, 48, 52; 23/182

[56] References Cited

UNITED STATES PATENTS

| | | |
|---|---|---|
| 2,603,570 | 7/1952 | Bole.....................................106/73 X |
| 2,693,456 | 11/1954 | Fennell...................................252/449 |
| 3,436,225 | 4/1969 | Raible..........................................99/48 |
| 3,480,390 | 11/1969 | Reinhardt et al. .......................23/182 |
| 1,555,639 | 9/1925 | Day .......................................252/449 |

*Primary Examiner*—C. F. Dees
*Attorney*—Fleit, Gipple & Jacobson

[57] ABSTRACT

The adsorbent based on montmorin minerals is preferably intended for the treatment of fermentable or fermented liquids, particularly of beer or wine and their precursors, and contains added, highly dispersed free silica, which has been produced in situ as non-gelatinous silica and which is localized between the layers of the clay mineral.

31 Claims, No Drawings

ADSORBENT FOR BEVERAGES

This invention relates to an adsorbent based on montmorin minerals, preferably for a treatment of fermentable or fermented liquids, particularly of beer or wine and their precursors, wort and must, and a process of producing said adsorbent.

It is known that clay minerals capable of adsorbing protein compounds can be used for a treatment of beverages, particularly of fermented beverages, such as wine and beer, in order to improve the quality thereof. The adsorbents which may be used for this purpose include naturally occurring clay minerals, particularly of the montmorin group, such as montmorillonite, beidellite and hectorite, although clay products produced by an acid activation treatment of montmorin minerals have also proved satisfactory.

Acid-activated clay minerals are usually produced in such a manner that a suitable raw clay, mostly in a state of fine division or particularly in a pre-expanded state, is subjected to a treatment with acids, preferably mineral acid, which treatment may be carried out at an elevated temperature, if desired, and causes the exchangeable cations and under the action of a strong acid also the crystal structure cations, particularly iron, aluminum, calcium, and magnesium, to enter into solution from the raw clay so that the clay contains also liberated silica in a larger or smaller amount, depending on the amount of acid which is used and the intensity of its action, in addition to the naturally occurring free silica. After the acid activation treatment, the solubilizing acid is removed, the clay residue is washed with water to remove acid and soluble salts, and then dried and ground.

The adsorption capacity of the montmorin minerals in their natural state or as acid-activated fuller's earth depends primarily on the quality or chemical composition of the raw clay which has been used. The adsorption capacity of the acid-activated fuller's earth depends also on the nature and degree of its solubilization. The rate and intensity of the adsorption will also be influenced by the particle size of the dry adsorbent. The adsorption capacity will generally be better, the finer is the adsorbent that is employed. There are limits in this respect because the use of extremely finely ground fuller's earth involves high losses of the substrate which is treated and because the separation of the adsorbent from the substrate is increasingly difficult as the fineness increases.

It is an object of the invention to produce adsorbents which are based on clay minerals and which are less dependent than before on the nature of the raw clay which is used, and which also distinguish by an improved adsorption capacity and finally have a sufficiently high activity even in a relatively large particle size so that they can be removed without difficulty by filtration from the substrate to be treated.

In a process of the kind described first hereinbefore the object set forth is accomplished in that, in accordance with the invention, free silica is liberated in a state of an extremely fine division and a homogeneous distribution between the layers of the clay mineral.

Hence, it is an object of the invention to provide an adsorbent which is based on montmorin minerals and contains free silica and is intended for use in the treatment of fermentable and fermented liquids, particularly beer and wine and their precursors, wort and must, and this adsorbent is characterized in that it contains added, highly dispersed free silica, which has been produced in situ as non-gelatinous silica, and a process of producing said silica.

It is known that dried adsorbents which are based on clay minerals and contain additional silica in the form of silica gel may be used in the treatment of beverages, such as wine and beer. The German Patent Specification 682,788, for instance, calls for an admixture of silica gel to such adsorbents. The Austrian Patent Specification 249,611 describes a treatment of beverages with naturally occurring or acid-activated clay minerals, which are supplied with finely ground silica gel having a predetermined surface area, a predetermined void ratio and predetermined pore radius.

The Belgian Patent Specification 693,928 describes the addition of water-glass to suspensions of raw clay before the acid activation treatment thereof. As a result, silica is liberated as silica gel during the boiling treatment. The object of the process according to the Belgian patent specification is exactly the opposite of what is desired by the present invention. As a result of the general liberation of silica gel in the boiling mixture, the montmorin mineral is embedded in a state of fine division in the silica gel. The procedure according to the Belgian patent specification has also the disadvantage that the reaction to form silica gel is not always complete and that the final product is a jellylike composition. The same can be recovered by filtration only with difficulty and an even more difficult and prolonged operation is required to wash it so as to remove the solubilizing acid.

The German Patent Specification 485,771 describes a process for the acid activation treatment of raw clay. In this process, a water-glass solution is added to the raw clay, the resulting mixture is subjected to evaporation to a state of considerable or perfect dryness, and the resulting evaporation residue is subjected to the acid activation treatment. It is an object of this procedure to produce fuller's earth products which are particularly strong and stable in form. In all these known processes, contrary to the present invention, the additional silica in the acid-activated clay mineral is not localized in its finest primary particles between the layers of the adsorbent.

Several procedures may be adopted in carrying out the invention, particularly to liberate the silica in a highly dispersed state in the montmorin mineral:

a. In accordance with the invention, silica may be produced in the montmorin mineral in situ in that a finely powdered montmorin mineral is suspended in an alkali silicate solution and the silica in that suspension is precipitated in a highly dispersed state in known manner thereby that the montmorin mineral suspension in water-glass and dilute acid are stirred at the same time into an electrolyte solution in such a ratio that a pH value between 5 and 8 is obtained. In this operation, the fine-powdered montmorin mineral may be suspended in the acid, which is then caused to react with a dilute alkali metal silicate solution.

b. In another embodiment of the invention, the free silica is produced in a state of very fine division in the montmorin mineral in that the latter is suspended in a preferably dilute solution of a soluble silicate, such as alkali metal water glass, whereafter the soluble alkali metal silicate is reacted to form an insoluble silicate, and finally acid is added in an amount which is equivalent to the liberated insoluble silicate to react with the insoluble silicate so as to form insoluble free silica.

In carrying out the present invention, the montmorin mineral may be used in the form of the naturally occurring clay or in the form of an acid-activated modification. Alternatively, the liberation of the silica in the aluminum silicate is succeeded by an acid activation treatment of the clay component or, where an acid-activated mineral has been used, the solubilizing treatment thereof with an acid may be continued.

Regardless of how the silica is liberated in the montmorin mineral, products can thus be obtained in which the montmorin component is substantially preserved in its raw state. If the invention is carried out using an acid-activated montmorin mineral or if the liberation of silica in the montmorin mineral is continued by an acid activation treatment the resulting fuller's earth product will contain added silica, which is localized in a state of extremely fine division and homogeneous distribution between the layers of the mineral.

Regardless of the manner in which each reaction is performed in accordance with the above, it is necessary at the end of the reaction to filter the entire mixture and to wash it so as to remove all water-soluble reaction products. The montmorin-silica product is then partly or completely dried and is ground, if desired.

In carrying out the present invention it will not make a difference how much added free silica is liberated in the montmorin mineral. The amount of this added silica will depend on the amount of water-glass solution or montmorin mineral used in a given mixture. Either the montmorin component or the silica component may predominate in the product.

The production of highly dispersed silica in the montmorin mineral by procedures (a) and (b) is similar to known processes of recovering silica. Procedure (b) will be explained more fully hereinafter.

For instance, finely ground raw clay may be suspended in a dilute solution of water-glass, possibly with an addition of sodium salts which promote the swelling, and the resulting mixture may be intensely stirred into a solution of substances which result immediately in a separation of insoluble silicate from the water-glass, preferably a neutral or acid solution of salts, e.g., of calcium, magnesium, aluminum or iron, which must be used in such an amount that it is approximately equivalent to the amount of water-glass which has been used. The reaction with the water-glass then causes a precipitation of finely divided silicate of calcium, magnesium, aluminum or iron in the suspension of clay. Preferably after being aged by boiling, e.g., for 15 minutes, these insoluble silicates may be preferably reacted with an equivalent amount of acid to form the free insoluble silica. It may be of advantage if the second reaction to form the free silica is carried out at an elevated temperature.

Depending on the nature of the salts which are used to react the alkali metal water-glass so as to form an insoluble silicate first and free silica thereafter, the adsorption properties of the finished product may be varied. For instance, if calcium salts may be added, the second reaction with acid will result in the liberation of silica in a state of fine division in the raw clay. If salts of iron or aluminum are used, the fine structure of the eventually liberated silica may be varied by a suitable after-treatment during the washing and drying steps. For instance, if such product is washed with alkaline solutions before it is finally dried, the silica which is formed from the water-glass as a result of the reaction has adsorption properties which are more similar to those of a coarse-pored silica gel. If the washed mixture has a slightly acid reaction before the drying, the silica will have a character which is more similar to that of a fine-pored gel. Depending on requirements, all intermediate states may be obtained by a variation of the pH value of the moist silica-containing, solubilized clay product before the drying.

In another procedure, montmorin minerals are subjected to an acid activation treatment first. The pores and the lattice structure of the minerals are then filled with the acid solution of the cations which are dissolved out of the mineral, mainly aluminum and iron. Dilute water-glass solution in an amount which is equivalent to the amount of dissolved cations is then intensely stirred into the mixture of dissolved cations, so that insoluble silicate is formed in the solubilized clay. Thereafter, acid is added in an amount which is required for the liberation of silica from precipitated silicate.

A solution of the solubilizing acid which is obtained by the acid activation treatment of clays, specifically by the separation of the solubilized clay from the solubilizing liquid, may be used to react with the alkali metal water-glass added to the montmorin mineral so that an insoluble silicate is formed. This solution of the solubilizing acid contains in addition to a small residual amount of acid particularly the cations, particularly iron and aluminum, which are dissolved out of the clay material during the solubilizing treatment with acid. The use of this solution of solubilizing acid for the first reaction of the alkali metal water-glass to form silicate eliminates the need for an expenditure of chemicals in this step.

It is difficult, exactly to determine the contents of salts in the solution of the solubilizing acid. When the solution of the solubilizing acid is employed, the preferred practice is to determine by a small-scale test how much water-glass solution can be stirred into a predetermined amount of the solution of solubilizing acid to adjust the pH value of that solution to about 5-6. The result is used to determine the amount of solubilizing acid into which the mixture which contains water-glass should be stirred. The precipitate formed by the reaction of the alkali metal silicate with the solution of the solubilizing acid is treated with acid in the required amount to liberate silica, whereafter the product is washed, dried, and ground. The mixture in which an insoluble silicate has been precipitated by a reaction with a solution of solubilizing acid may be additionally subjected to an acid activation treatment in that the whole is boiled together with additional acid and the resulting product is processed in the usual manner.

If the first reaction of the water-glass added to the montmorin mineral to form insoluble silicate is effected with the aid of salts of aluminum or iron, as has been described, or of spent solubilizing acid, as has just been described, and the acid required to react with the precipitated silica and to activate the clay is added thereafter, the silica will be liberated in a particularly fine form. This result may improve the adsorption capacity of the final product subsequently obtained. The liberated silica may be so fine that it renders the separation of the solubilized residue from the solubilizing acid more difficult. To avoid this, it may be of advantage to boil the entire mixture which has been obtained by the reaction of water-glass to form insoluble silicate and to delay the addition of the reactant and activating acid until the boiling has proceeded for some minutes.

Whether the clay-silica product is produced with or without an additional acid activation treatment of the clay component, the adsorption properties of the liberated additional silica may be varied, as described above, if care is taken during the final washing to remove the acid or salts so that the residual clay which is subjected to drying has a slightly acid or neutral or slightly alkaline reaction.

Besides, the final washing may also be controlled to adjust the amount of iron and aluminum which are still contained in the final product and which are soluble in slightly acid liquids, such as beverages. When it is desired to produce fuller's earth products intended for the treatment of beverages, a minimum content of iron and aluminum which are soluble in the respective beverage may be of special importance. To reduce the amount of iron and aluminum which have been added to the beverage, the solubilizing treatment of the montmorin minerals with acid may be succeeded by a treatment of such minerals with acids which form complexes with iron and/or aluminum in water and/or acid liquids. Suitable complexing substances may include aqueous or acid solutions of chelate-forming substances, such as polyphosphoric acids; dicarboxylic acids, such as oxalic acid; and oxygen-containing acids, such as citric acids; and their salts.

The washed adsorbent may be used in a moist state as well as in a partly or completely dried state. This will depend on the nature of the substrate with which the adsorbent is to be treated. Dry fillers or finely powdered substances having an adsorption action themselves, such as kieselguhr, finely ground silica gel, finely ground fuller's earth, finely ground raw clay, activated carbon etc. may be admixed to the moist raw product so that a finished product is obtained which can trickle and appears to be dry.

Adsorbents for use in the beverage industry may be required to have good filtering properties because it is desired, e.g., to add the adsorbent to the beverage, e.g., during the sedimentation filtering operation and to remove the adsorbent immediately thereafter. For this purpose it has proved desirable to dry the adsorbent to a moisture content of 20-40 percent. Such products can be ground and handled like a powder. Depending on the selected moisture content, the contents of extremely fine particles, which obstruct the filtration, in the ground end product may be controlled. For instance, a product containing about 25 percent added silica and such a fineness that 100 percent of the particles are less than 0.1 millimeter contains very small particles only in such a small amount that the product can be filtered like medium-fine filtration kieselguhr. With a moisture content of 15 percent, the same product in which 100 percent of the particles are less than 0.1 millimeters will filter much more slowly. If the same product is dried to a moisture content of 0 percent before it is ground, its content of very fine particles will be so high that it can be used for filtration only together with filtering aids.

In the preparation of beer, the adsorbent according to the invention may be used after the wort has been boiled in the brew house. The adsorbent may also be added before or after the wort has been cooled, after the main fermentation or after the aging of the beer.

In the preparation of wine, the adsorbent is added to the must or to the fermented wine.

EXAMPLE 1

Two-hundred grams of raw montmorillonite (calcium bentonite) clay from the deposits near Moosburg, Bavaria, in a dry and finely ground state, are suspended in 1 liter of a water-glass solution ($d = 1.1$). One-hundred fifty grams of sodium chloride are dissolved in 2 liters of water of 65° C. The suspension of bentonite in water-glass is slowly charged into said common salt solution with stirring. Sulfuric acid having a concentration of 10 percent is added at the same time. The feeding of the bentonite suspension and sulfuric acid is controlled so that the pH value is between 7 and 8.

Thereafter, 200 milliliters of concentrated hydrochloric acid are added. The mixture is then boiled for 6 hours in order to activate the montmorillonite component by a treatment with acid. The resulting product is suction-filtered, washed to remove all water-soluble reaction products, and finally dried and finely ground.

EXAMPLE 2

One kilogram of finely ground raw montmorillonite clay from the deposits near Moosburg, Bavaria, is suspended in 5 liters of water. One liter of concentrated hydrochloric acid is added and the resulting mixture is boiled for 6 hours and then suction-filtered. The filter cake is subsequently washed to remove all water-soluble substances.

The moist filter cake of acid-activated clay is now suspended in 1 liter of water. One liter of sodium water-glass ($d = 1.2$) is added. This suspension is slowly run into 4 liters of a common salt solution (70 grams NaCl/l) at 60° C. At the same time, sulfuric acid of 10 percent concentration is added at such a rate that a pH value of 5–6 is constantly maintained. The entire mixture is then filtered; the filter cake is washed with water to remove soluble reaction products, dried to a residual water content of 25 percent and finally ground.

EXAMPLE 3

One-hundred fifty grams of dried and finely ground montmorillonite clay (calcium bentonite) from the deposits near Moosburg, Bavaria, are stirred into 1,000 milliliters of distilled water. One-hundred fifty milliliters of a water-glass solution ($d = 1.2$) are added to the mixture, which is allowed to stand for 1 hour and then stirred into 150 milliliters of a solution of 219 grams of $CaCl_2 \cdot 6H_2O$ per liter. Five hundred milliliters $H_2O$ are added as a diluent as the solution is stirred in. The mixture is then boiled. Forty milliliters of concentrated hydrochloric acid are added to convert the precipitated calcium silicate into silica. After one-fourth hour, this mixture is suction-filtered and washed to remove all acid and soluble salts. The resulting product is dried at 150° C. and finely ground.

EXAMPLE 4

As in Example 3, two portions of 150 grams of dried and finely ground montmorillonite clay from the deposits near Moosburg, Bavaria, are suspended each in 1,000 milliliters water. One-hundred fifty milliliters water-glass solution ($d = 1.2$) are added to one of these suspensions. After standing for one hour, the mixture which contains water-glass is stirred into 135 milliliters of an acid solution of the solubilizing acid, which solution is obtained in the production of acid-activated fuller's earth and contains iron chloride and aluminum chloride. A total of 1,000 milliliters water is stirred in as a diluent. When the bentonite suspension has been stirred in, the pH value of the total mixture is about 5. The mixture is then boiled for one-fourth hour. Forty milliliters of concentrated hydrochloric acid are then added to transform the precipitated silicates of iron and aluminum into free silica. After a quarter of an hour, the mixture as well as the comparison sample prepared without water-glass are suction filtered and washed with water to remove acid and soluble salts. Both samples are then dried and ground.

Five-gram portions of the sample which contains additional silica and of the comparison sample are suspended each in 50 milliliters water. Further 5-gram portions of the two samples are suspended each in 50 milliliters of a 0.2 percent sodium carbonate solution. The amounts of sediment obtained after 24 hours are as follows:

|  | Suspension in water | Suspension in sodium carbonate |
| --- | --- | --- |
| Clay mineral containing no added silica | 18 milliliters | 47 milliliters |
| Clay mineral containing added silica | 10 milliliters | 13 milliliters |

Both samples were used for a protein stabilization of beer in a small-scale test, in which the sample containing added kieselgur has approximately the same activity as the untreated raw clay. Because the sample containing added silica has a smaller swelling capacity, it can be separated from the beer by filtration without difficulty.

EXAMPLE 5

Three hundred grams of dried and finely ground montmorillonite clay from the United States (the exact origin is not known) were suspended in a mixture of 1,500 milliliters water and 130 milliliters water-glass solution ($d = 1.2$).

The mixture is then stirred into a mixture of 150 milliliters calcium chloride solution (219 grams $CaCl_2 \cdot 6H_2O$ per liter) and 600 milliliters water. A total of 700 milliliters water as a diluent are added as the clay suspension is stirred in. Three hundred forty milliliters of concentrated hydrochloric acid are added to the mixture when the same has been boiled for half an hour. To activate the clay component by a treatment with acid, the mixture is then boiled for 6 hours. The boiled mixture is then suction-filtered and washed with water to remove acid and soluble salts. The solid is then dried to a solids content of 80 percent and is ground to pass through a screen having a mesh size of 0.1 millimeter.

EXAMPLE 6

Three hundred grams of montmorillonite clay from the deposits near Moosburg, Bavaria, are suspended in 1,500 milliliters water. One hundred fifty milliliters water-glass solution ($d = 1.2$) are added to that suspension, which is allowed to stand for one hour and then added with intense stirring to 600 milliliters of a solution of 31.5 grams $Al_2(SO_4)_3 \cdot 18H_2O$ and 2.1 milliliters concentrated sulfuric acid. Additional 700 milliliters of water are added as the suspension is stirred in. This will result in a pH value of about 5. When the mixture has been boiled for one-fourth hour, 340 milliliters of concentrated hydrochloric acid are added. Boiling is then continued for five hours. The entire mixture is subsequently placed on a suction filter and subjected to suction. The filter cake is washed with a solution of 50 milliliters concentrated hydrochloric acid in 1 liter of water and thereafter with a solution of 15 grams sodium metaphosphate in water and subsequently with 2 liters of water which contains 20 milliliters concentrated ammonia solution per liter. The washed product is dried and then ground to pass entirely through a screen having a mesh size of 0.1 millimeter. The yield in this experiment is 250 grams fuller's earth, which contains about 30 grams added silica from the added water-glass.

EXAMPLE 7

The solubilizing acid which is obtained in the production of fuller's earth from the montmorillonite clay is used here for the reaction with the water-glass, which has been added to the clay suspension, to form insoluble silicate. The solution of the solubilizing acid used in the present case contained a small residue of free hydrochloric acid and mainly chlorides of iron, aluminum and calcium. In a preliminary test it had been found that 280 milliliters of the solution of solubilizing acid had to be used with 300 milliliters of water-glass solution ($d = 1.2$) if a pH value of about 5 was desired when the water-glass had been stirred in.

One hundred fifty grams of montmorillonite clay from the deposits in Moosburg, Bavaria, were suspended in 1,000 milliliters water. Three hundred milliliters of water-glass solution ($d = 1.2$) were added to this suspension. The resulting mixture is allowed to stand over the weekend. The montmorillonite suspension is then charged with intense stirring into a solution of 1,000 milliliters water and 280 milliliters clay-solubilizing acid. Additional 500 milliliters of water as a diluent are added as the suspension is charged. When the resulting mixture has been boiled for one-fourth hour, 230 milliliters of concentrated hydrochloric acid are added and the entire mixture is boiled for 6 additional hours to activate the clay component by a treatment with acid. The product is washed on a suction filter to remove the solubilizing acid. The filter cake is washed to remove soluble salts and acid. An after-washing operation is performed using 2 liters of water which contains 20 milliliters concentrated ammonia solution per liter. The adsorbent is dried and ground. In the present case, the yield was 170 grams, including 60 grams of added silica.

EXAMPLE 8

One hundred fifty grams of dried and finely ground montmorillonite clay from the deposits near Moosburg, Bavaria, are suspended in 1,000 milliliters water. When 50 milliliters of concentrated hydrochloric acid have been added to the suspension, the same is boiled for 6 hours. One thousand milliliters of cold water are then added. Two hundred ten milliliters of water-glass solution ($d = 1.2$) are charged with intense stirring into this suspension of acid-activated montmorillonite clay into hydrochloric acid which contains chlorides of iron, aluminum and calcium. The entire mixture has a final pH value of 5. It is again boiled for half an hour. Sixty milliliters of concentrated hydrochloric acid are added to liberate the silica from the precipitated silicate. After one-fourth hour, the entire mixture is suction-filtered and washed with water to remove all soluble salts and acids.

EXAMPLE 9

The same raw montmorillonite clay from the deposits near Moosburg, Bavaria, is used to produce five fuller's earth products which contain different amounts of added silica. The procedure is similar to that of Example 7. The dried products contained added silica approximately in the following amounts:

$a = 0\%$
$b = 13.5\%$
$c = 24\%$
$d = 38\%$
$e = 55\%$

The products were washed to remove the solubilizing acid and then after-washed with ammonia solution. They were used in a perfectly dry state and after being ground to such a fineness that 100 percent of the sample passed through a screen having a mesh size of 0.1 millimeter.

0.25 grams of each of these five adsorbents was suspended in 50 milliliters of pH 4 Sorensen buffer, which contained 1 gram per liter of soluble polyvinylpyrrolidone ("Collidon 17"). When the solution had been shaken for 2 hours, its polyvinylpyrrolidone content was determined, with the following results:

$a = 290$ milligrams per liter
$b = 207$ milligrams per liter
$c = 68$ milligrams per liter
$d = 54$ milligrams per liter
$e = 26$ milligrams per liter.

By the model test using dissolved polyvinylpyrrolidone, this example shows that the adsorption capacity of the fuller's earth products containing added free silica differs greatly in adsorption capacity from the comparison product.

EXAMPLE 10

The five preparations of the preceding Example 9 are used in this experiment. For a comparison, finely ground silica gel of the kind used in the brewery for a stabilization of bear, was also tested.

In a small-scale test, unfiltered, pale, full-bodied beer from a Munich brewery was contacted with 0.5 grams per liter of the above-mentioned test samples during the Kieselguhr filtration. The filtered beer was subjected to an accelerated aging test, in which it was maintained for three days at 40° C. and for 3 days at 0° C., in daily alternation. At the end of this accelerated aging test, the samples exhibited the following turbidity due to low temperature:

| | |
|---|---|
| Product a (0.5 gram per liter) | = 2.4 EBC units |
| Product b (0.5 gram per liter) | = 1.8 EBC units |
| Product c (1.1 grams per liter) | = 1.1 EBC units |
| Product d (1.1 grams per liter) | = 1.1 EBC units |
| Product e (0.7 gram per liter) | = 0.7 EBC unit |
| Finely ground silica gel | = 1.1 EBC units |
| Control beer not treated with adsorbent | = 8 EBC units |

The present example shows that the fuller's earth preparations containing added silica have an improved protein-stabilizing activity in beer. This activity approaches and in some products even exceeds that of finely ground silica gel.

EXAMPLE 11

In accordance with Example 5, an acid-activated fuller's earth product is produced from raw montmorillonite clay from the deposits of Moosburg, Bavaria. As a result of a precipitation with calcium chloride, the finished product contains about 23 percent added silica.

After a final washing, portions of the product are dried to residual moisture contents of 30, 20, and 0 percent, respectively. All three products are finely ground and screened through a screen having a mesh size of 0.1 millimeter. The material having a particle size below 0.1 millimeter is used in the filtering test.

The sedimentation filtration with kieselguhr is carried out on a laboratory scale in accordance with the method described in "Monatsschrift für Brauerei", 21, page 277, 1968.

Pale, unfiltered, full-bodied beer from a Munich brewery was used in this filtering test. In this small apparatus, the initial sediment amounted to 1.22 kilograms of "Standard-Supercel" filtration kieselguhr per square meter of the filter area. The feed kieselguhr consisted of 0.7 gram per liter "Standard-Supercel."

The following times were required to obtain 500 milliliters filtered beer using a filter surface of 7 square centimeters:

| | |
|---|---|
| Control beer (filtered with "Standard-Supercel" fed at a rate of 70 grams per hectoliter) | 1920 seconds |
| "Standard-Supercel" and test product containing 30% water, fed at respective rates of 70 and 50 grams per hectoliter | 1895 seconds |
| "Standard-Supercel" and test product containing 20% water, fed at respective rates of 70 and 50 grams per hectoliter | 2120 seconds |

"Standard-Supercel" and completely dry test product, fed at respective rates of 70 and 50 grams per hectoliter     2530 seconds

What is claimed is:

1. An adsorbent for the treatment of fermentable or fermented liquids, particularly of beer or wine and their precursers, comprising a montmorin mineral substance containing in situ-formed, highly disperse, non-gelatinous silica between the layers of the montmorin mineral substance.

2. A process for producing an adsorbent comprising mixing a montmorin mineral substance, an alkali metal silicate, a mineral acid and a soluble salt of a mineral acid whose cation is an alkali metal, an alkaline earth metal, aluminum or iron in water, filtering the mixture when the reaction has been completed, and washing the filter cake thus formed.

3. A process according to claim 2, characterized in that the montmorin mineral is suspended in an alkali metal silicate solution and this suspension and a solution of a mineral acid are separately charged at the same time into an electrolyte solution which contains alkali metal salts of mineral acids, while a pH value of 5–8 is maintained, whereafter silica is liberated.

4. A process according to claim 2, characterized in that the montmorin mineral is suspended in an alkali metal silicate suspension and this suspension is charged into a neutral or acid solution of alkaline earth metal salts, aluminum salts or iron salts of mineral acid, which solution has a cation concentration which is approximately equivalent to that of the alkali metal silicate, and when the reaction has been completed, the silica is liberated.

5. A process according to claim 4, characterized in that the montmorin mineral substance is suspended in an alkali metal silicate suspension, the suspension is mixed with the acid solution of salts obtained by the acid activation treatment of clay minerals with mineral acids and, when the reaction has been completed, the silica is liberated by adding an equivalent amount of acid.

6. A process according to claim 4, characterized in that the clay-silicate product is aged before the silica is liberated from the insoluble silicate.

7. A process according to claim 6, characterized in that the aging is effected at elevated temperatures.

8. A process according to claim 4, characterized in that the silica is liberated at elevated temperatures.

9. A process according to claim 2, characterized in that raw montmorin clay is used.

10. A process according to claim 2, characterized in that acid-activated montmorin mineral is used.

11. A process according to claim 2, characterized in that a raw clay is suspended and the clay component is subjected to an acid activation treatment with acid when the silica has been liberated.

12. A process according to claim 2 characterized in that an expansion-promoting substance consisting essentially of an alkali metal salt of a mineral acid is added to the suspension of the raw montmorin clay in the alkali metal silicate solution.

13. A process according to claim 2, characterized in that the montmorin mineral is suspended in the mineral acid and this suspension and an alkali metal silicate solution are separately charged at the same time into an electrolyte solution which contains alkali metal salts of mineral acids while a pH value of 5–8 is maintained, and the silica is liberated.

14. A process according to claim 13, characterized in that the montmorin mineral is activated before it is suspended in the mineral acid solution.

15. A process according to claim 2, characterized in that the montmorin mineral is suspended in an acid or neutral solution of mineral acid salts of alkaline earth metals, aluminum or iron, an mineral acids, or in the solubilizing acid obtained after the activation of, an, alkali metal silicate solution is added to the suspension until a pH value of 5–8 is reached, and the silica is subsequently liberated from the insoluble silicate with the aid of an equivalent amount of acid.

16. A process according to claim 15, characterized in that the montmorin mineral is activated by a treatment with acid before it is suspended.

17. A process according to claim 2, characterized in that the raw end product is filtered off and the porous structure of the silica component is varied by washing with an acid or alkaline liquid.

18. A process according to claim 2 characterized by a final washing with a substance which forms a chelate with iron or aluminum ions in water or an acidic liquid.

19. A process according to claim 2, characterized in that the washed mineral-silica products are partly or completely dried.

20. A process according to claim 19, characterized in that the washed mineral is dried to a solids content of about 20–40 percent.

21. A process according to claim 2, characterized in that dry adsorbents or non-adsorbents are added to the moist mineral.

22. The process of claim 2, wherein the filter cake is dried and ground.

23. The process according to claim 4, characterized in that raw montmorin clay is used.

24. The process according to claim 4, characterized in that acid-activated montmorin mineral substance is used.

25. The process according to claim 4, characterized in that a raw clay is suspended and the clay component is subjected to an acid activation treatment with acid when the silica has been liberated.

26. The process according to claim 4, characterized in that an expansion-promoting substance consisting essentially of an alkali metal salt of a mineral acid is added to the suspension of the raw montmorin clay in the alkali metal silicate solution.

27. The process according to claim 13, characterized in that the montmorin mineral is activated after the silica has has been liberated.

28. The process according to claim 15, wherein the acid or neutral solution of mineral acid salts of alkaline earth metals, aluminum or iron is obtained by the acid activation treat-ment of clay minerals with mineral acids.

29. The process according to claim 15, characterized in that the montmorin mineral is activated by a treatment with acid after the silica has been liberated from the silicates.

30. The process according to claim 4 wherein the liberation of silica is accomplished at an elevated temperature.

31. The process according to claim 15, wherein after the alkaline metal silicate solution is added to the suspension so that a pH value of 5 to 8 is reached, the mineral silicate product is aged.

* * * * *